(12) United States Patent
Ter Haseborg et al.

(10) Patent No.: US 11,110,880 B2
(45) Date of Patent: Sep. 7, 2021

(54) TRIM COVER FOR SEAT WITH AIRBAG MODULE

(71) Applicant: LEAR CORPORATION, Southfield, MI (US)

(72) Inventors: Judith Ter Haseborg, Oberding (DE); Thorsten Vogel, Oberding (DE)

(73) Assignee: LEAR CORPORATION, Southfield, MI (US)

( * ) Notice: Subject to any disclaimer, the term of this patent is extended or adjusted under 35 U.S.C. 154(b) by 81 days.

(21) Appl. No.: 16/508,834

(22) Filed: Jul. 11, 2019

(65) Prior Publication Data

US 2020/0114859 A1 Apr. 16, 2020

(30) Foreign Application Priority Data

Oct. 15, 2018 (DE) .......................... 102018217629.9

(51) Int. Cl.
*B60R 21/207* (2006.01)
*B60R 21/2165* (2011.01)
*B60N 2/58* (2006.01)

(52) U.S. Cl.
CPC .............. *B60R 21/207* (2013.01); *B60N 2/58* (2013.01); *B60R 21/2165* (2013.01); *B60N 2002/5808* (2013.01)

(58) Field of Classification Search
CPC .......... B60N 2002/5808; B60R 21/207; B60R 21/2165; B60R 2021/2076
See application file for complete search history.

(56) References Cited

U.S. PATENT DOCUMENTS

| 6,074,003 | A | 6/2000 | Umezawa et al. |
| 7,695,064 | B2 * | 4/2010 | Thomas ................ B60R 21/207 |
| | | | 297/216.16 |
| 9,545,892 | B2 | 1/2017 | Zimmermann |
| 2006/0113753 | A1 | 6/2006 | Tracht et al. |
| 2006/0113765 | A1 | 6/2006 | Tracht |
| 2006/0113771 | A1 * | 6/2006 | Tracht ................... B60R 21/207 |
| | | | 280/730.2 |
| 2008/0073952 | A1 * | 3/2008 | Tracht ................... B60R 21/207 |
| | | | 297/216.13 |
| 2009/0315305 | A1 | 12/2009 | Evans et al. |
| 2011/0095578 | A1 | 4/2011 | Festag |

(Continued)

FOREIGN PATENT DOCUMENTS

| DE | 102005002200 A1 | 8/2005 |
| EP | 0788940 B1 | 12/2002 |
| FR | 2823165 A1 | 10/2002 |

OTHER PUBLICATIONS

Office Action of German Application No. DE102018217629.9, dated Jun. 19, 2019, 8 pages.

*Primary Examiner* — Paul N Dickson
*Assistant Examiner* — Mary E Young
(74) *Attorney, Agent, or Firm* — Brooks Kushman P.C.

(57) ABSTRACT

A vehicle seat assembly is provided having a seat frame and a foam cushion supported on the seat frame. An airbag module is positioned in an opening formed in the foam cushion. A trim cover assembly covering the foam cushion and airbag module has an interlay material sewn to a trim panel at an interlay seam. The interlay material extends from the interlay seam to cover an outboard surface of the airbag module inside the trim panel to ensure the airbag module is not visible through the trim panel.

20 Claims, 3 Drawing Sheets

(56) References Cited

U.S. PATENT DOCUMENTS

| | | | |
|---|---|---|---|
| 2013/0082495 A1* | 4/2013 | Festag | B60R 21/207 |
| | | | 297/216.1 |
| 2014/0021706 A1* | 1/2014 | Festag | B60R 21/23138 |
| | | | 280/730.2 |
| 2014/0117648 A1* | 5/2014 | Tracht | B60R 21/207 |
| | | | 280/728.2 |
| 2015/0367805 A1* | 12/2015 | Santi | B60R 21/207 |
| | | | 280/728.3 |
| 2016/0159307 A1* | 6/2016 | Fujiwara | B60R 21/263 |
| | | | 280/729 |
| 2016/0244018 A1 | 8/2016 | Zimmermann | |
| 2017/0259770 A1* | 9/2017 | Fujiwara | B60R 21/264 |
| 2018/0022304 A1 | 1/2018 | Yoshikai et al. | |
| 2019/0023217 A1* | 1/2019 | Ohno | B60R 21/33 |

\* cited by examiner

US 11,110,880 B2

TRIM COVER FOR SEAT WITH AIRBAG MODULE

CROSS-REFERENCE TO RELATED APPLICATIONS

This application claims foreign priority benefits under 35 U.S.C. § 119(a)-(d) to DE 102018217629.9, filed Oct. 15, 2018, the disclosure of which is hereby incorporated by reference in its entirety.

TECHNICAL FIELD

The present application relates to a seat assembly having a trim cover and an inflatable airbag that may be provided with a vehicle.

BACKGROUND

Vehicles can be equipped with side airbags, which may be in the form of an air bag disposed within a vehicle seat assembly. One example of a vehicle seat having an inflatable airbag is disclosed in U.S. Pat. No. 9,545,892 issued to Lear Corporation.

SUMMARY

According to at least one embodiment, a vehicle seat assembly with a seat frame and a foam cushion supported on the seat frame. An airbag module is positioned in an opening formed in the foam cushion. A trim cover assembly covers the foam cushion and airbag module and has an interlay material sewn to a trim panel at an interlay seam. The interlay material extends from the interlay seam to at least partially cover an outboard surface of the airbag module inside the trim panel to ensure the airbag module is not visible through the trim panel.

In another embodiment, the seat frame defines a bolster portion of the seat. The airbag module is positioned in the opening formed in the foam cushion along the bolster portion.

In another embodiment, the vehicle seat assembly has a back panel secured to the seat frame. The interlay seam is concealed by the back panel.

In another embodiment, the interlay material has a fabric stiffness greater than the trim panel.

In another embodiment, the interlay material comprises a polyester fleece.

According to at least one embodiment, a vehicle seat assembly is provided. The vehicle seat assembly has a foam cushion layer and an airbag module positioned in an opening along the foam cushion layer. A trim panel covers the foam cushion and the airbag module. An interlay material is sewn to the trim panel. The airbag module is arranged between the interlay material and the foam cushion layer.

In another embodiment, the interlay material has an interlay area less than a panel area of the trim panel to which the interlay material is sewn.

In another embodiment, a deployment seam defined along the trim panel. The interlay material is not attached to the trim panel at the deployment seam.

In another embodiment, the deployment seam is forward of the airbag module. The interlay material is sewn to the trim panel at an interlay seam that is positioned rearward of the airbag module.

In another embodiment, the deployment seam has seam characteristics configured to rupture when the airbag module is deployed. The interlay seam has seam characteristics different than the deployment seam.

According to at least one embodiment, a bolster assembly for a vehicle seat is provided. A first trim panel and a second trim panel define a deployment seam. An interlay material is sewn to the first trim panel at an interlay seam spaced apart from the deployment seam. The bolster assembly has a frame and an airbag module arranged between the interlay material and the frame.

In another embodiment, the interlay material is not attached to the trim panel at the deployment seam.

In another embodiment, the interlay material has a thickness in the range of 1.2 millimeters to 1.4 millimeters.

In another embodiment, the deployment seam is forward of the airbag module. The interlay seam is located rearward of the airbag module.

In another embodiment, the interlay material comprises a polyester fleece.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
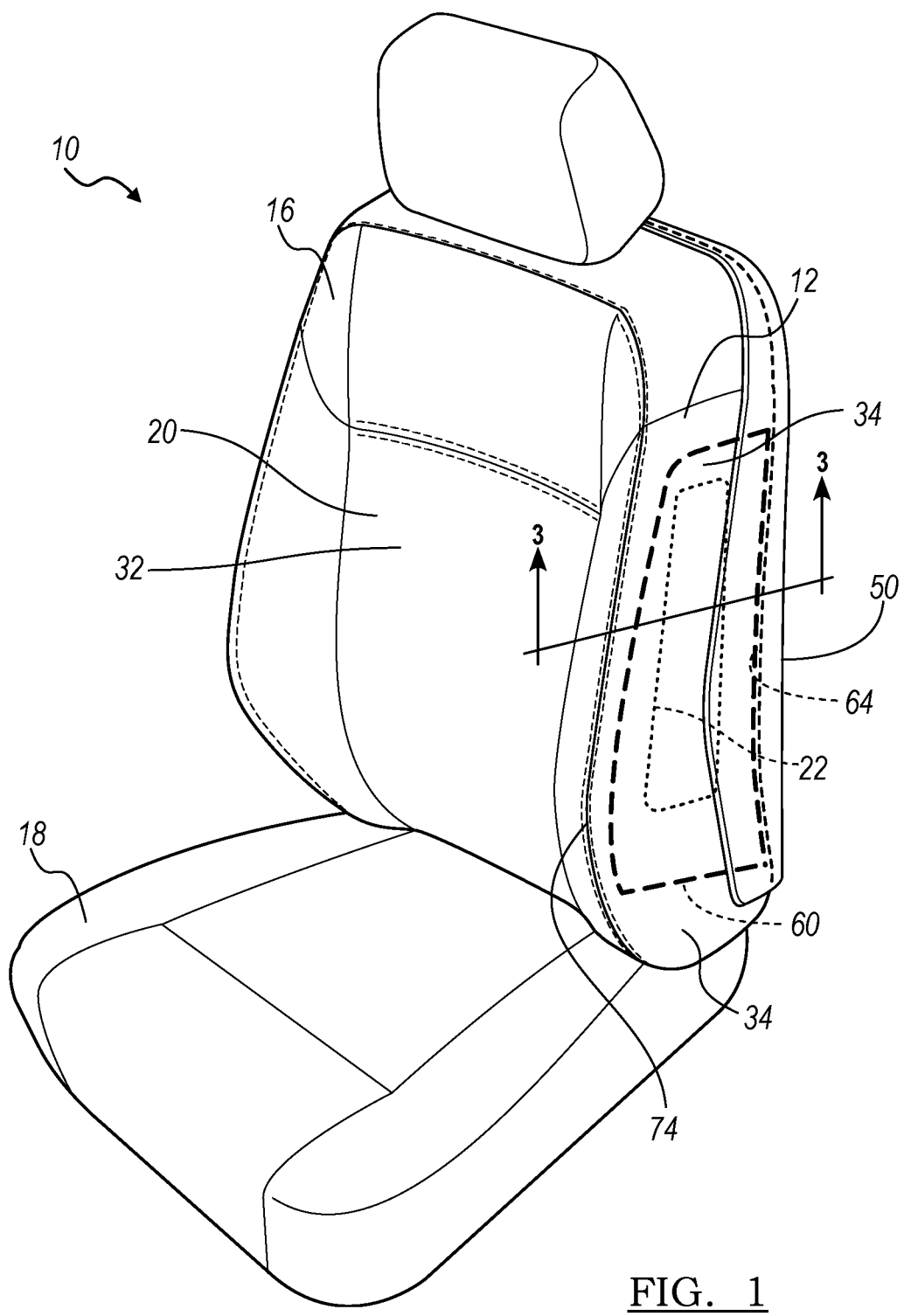
FIG. 1 is a perspective view of a vehicle seat assembly.

FIG. 1 an example of vehicle seat assembly 10 having a side bolster assembly an exemplary side bolster assembly 12 is shown. The side bolster assembly 12 may be provided with or configured for use with a vehicle, such as a motor vehicle like a car or truck. As shown, the side bolster assembly 12 may form the side portion of a seat back 16. In other embodiments, the side bolster assembly 12 may not be provided with the seat back and may be disposed proximate a vehicle seat back or may be mounted to the vehicle body.

The vehicle seat assembly 10 may include a seat bottom 18. The seat back 16 may be pivotally disposed on the seat bottom 18 such that the seat back 16 may pivot or rotate relative to the seat bottom 18 about an axis of rotation.

The side bolster assembly 12 may protrude forward of a central region 20 of seat back 16. A pair of side bolster assemblies 12 may be provided on the seat back 16 such that the side bolster assemblies 12 may be disposed at opposite lateral sides of the central seat back region 20.

Figure 3:
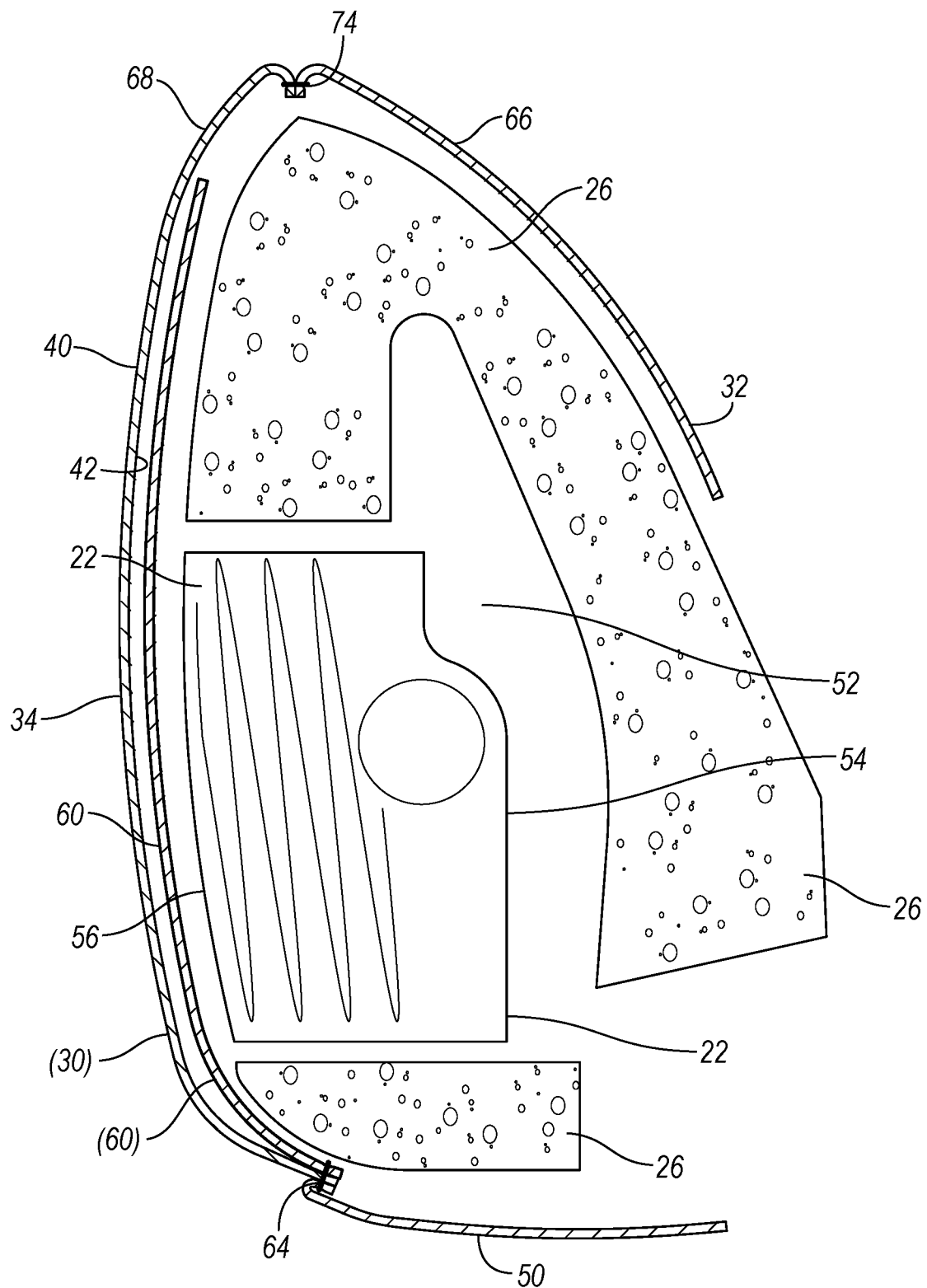
FIG. 3 is a section view of the side bolster assembly along section line 3-3.

The vehicle seat assembly 10 includes an airbag module 22. As shown in FIG. 3, the airbag module 22 may be positioned in the side bolster assembly 12. While the side airbag module 22 is shown on the side bolster assembly on the seat back 16, it is also possible for the airbag module 22 to be utilized with a seat bottom. Also, as illustrated, the airbag module 22 is located at an outboard lateral side or extremity of the seat assembly 10 to provide protection against adjacent vehicle structure, but it is also possible to have the airbag assembly 22 to be located at the inboard lateral side to provide protection against an adjacent vehicle occupant and to also have air bag assemblies at both outboard and inboard locations for protection in both lateral directions. The airbag module 22 includes an air bag and an inflator configured to supply inflation fluid, such as gas, to the air bag, thereby facilitating deployment of the air bag.

A trim cover 30 covers at least a portion of the vehicle seat assembly 10 and forms a forward seating surface 32 that may be configured to face toward and/or or support a seated occupant. In addition, the trim cover 30 may engage and may at least partially cover or conceal the foam cushion 26. The trim cover 30 may be made of any suitable material, such as cloth, vinyl, leather, or other suitable trim materials. The exterior surface 40 of the trim cover 30 forms the appearance surface of the seat, while the interior surface 42 of the trim cover 30 is disposed opposite the exterior surface 32. For example, the interior surface 42 may be disposed proximate the seat cushion 26.

As shown in FIG. 1, the trim cover 30 may cover the side bolster assembly 12 and the central seat back region 20. In addition, the trim cover 30 may extend around lateral sides 34 of the side bolster assembly 12 and extend in a rearward direction toward a rear side of the vehicle seat assembly 10 that may be disposed opposite the forward seating surface 32. The rear side of the vehicle assembly may be covered with a back panel 50.

The airbag module 22 is configured to deploy an airbag to help protect a seated occupant. In the deflated or in a stored condition the airbag module 22 is stored in an opening 52 in the foam cushion 26 along the bolster assembly 12. As shown in FIG. 3, the inboard surface 54 of the airbag module 22 may be covered with foam cushion 26 to ensure sufficient padding and comfort along the forward seating surface 32. The outboard surface 56 may only be covered with the trim cover 30 along the lateral sides 34 of the seat assembly 10. The outline of the airbag module 22 may be visible through the trim cover, which may be aesthetically undesirable. Even small or compact airbag modules may be visible through the trim cover 30.

To prevent the airbag module 22 being visible through the trim cover 30, an interlay material 60 is sewn to a trim panel to the trim cover 30 in a trim cover assembly. The airbag module 22 is arranged between the interlay material 60 and the foam cushion layer 26. The interlay material 60 covers an outboard surface 56 of the airbag module 22 and prevents the airbag module 22 from being visible through the trim cover 30.

The interlay material 60 is sewn to the trim cover at a seam 64. The interlay material 60 extends from the seam 64 to cover the outboard surface 56 of the airbag module 22. However, it is not necessary for the interlay material 60 to have the same surface area as the trim panel 68 to which the interlay material is sewn and the interlay material 60 may have an area less the area of the trim panel 68 to which the interlay material 60 is sewn.

The interlay material 60 layer is flexible and smooth to contour with the trim cover and the interlay material 60 has no creases. The interlay material 60 may have a needled, thermal fixed, smoothed surface. The interlay material 60 may have a fabric stiffness greater than the stiffness of the material of the trim cover. For example, the interlay material 60 may have a minimum tensile strength of 300 N/5 cm. In one embodiment, the interlay material 60 has a thickness in the range of 1.2 millimeters to 1.4 millimeters. The interlay material 60 may be formed of polyester, such as fleece, or other suitable material.

The trim cover 30 may also include a deployment seam 74 that severs in response to inflation of an airbag. The deployment seam 74 may be formed by stitching together two trim panels of the trim cover 30. In at least the illustrated embodiment, the trim cover 30 includes a first, or front panel 66 and a second or side panel 68 that cooperate to form the airbag deployment seam 74. The deployment seam 74 may extend in a generally vertical direction between the top and bottom of the side bolster assembly 12. It should be understood that the location of the deployment seam 74 may vary based on the seat configuration or location or other design variables.

Figure 2:
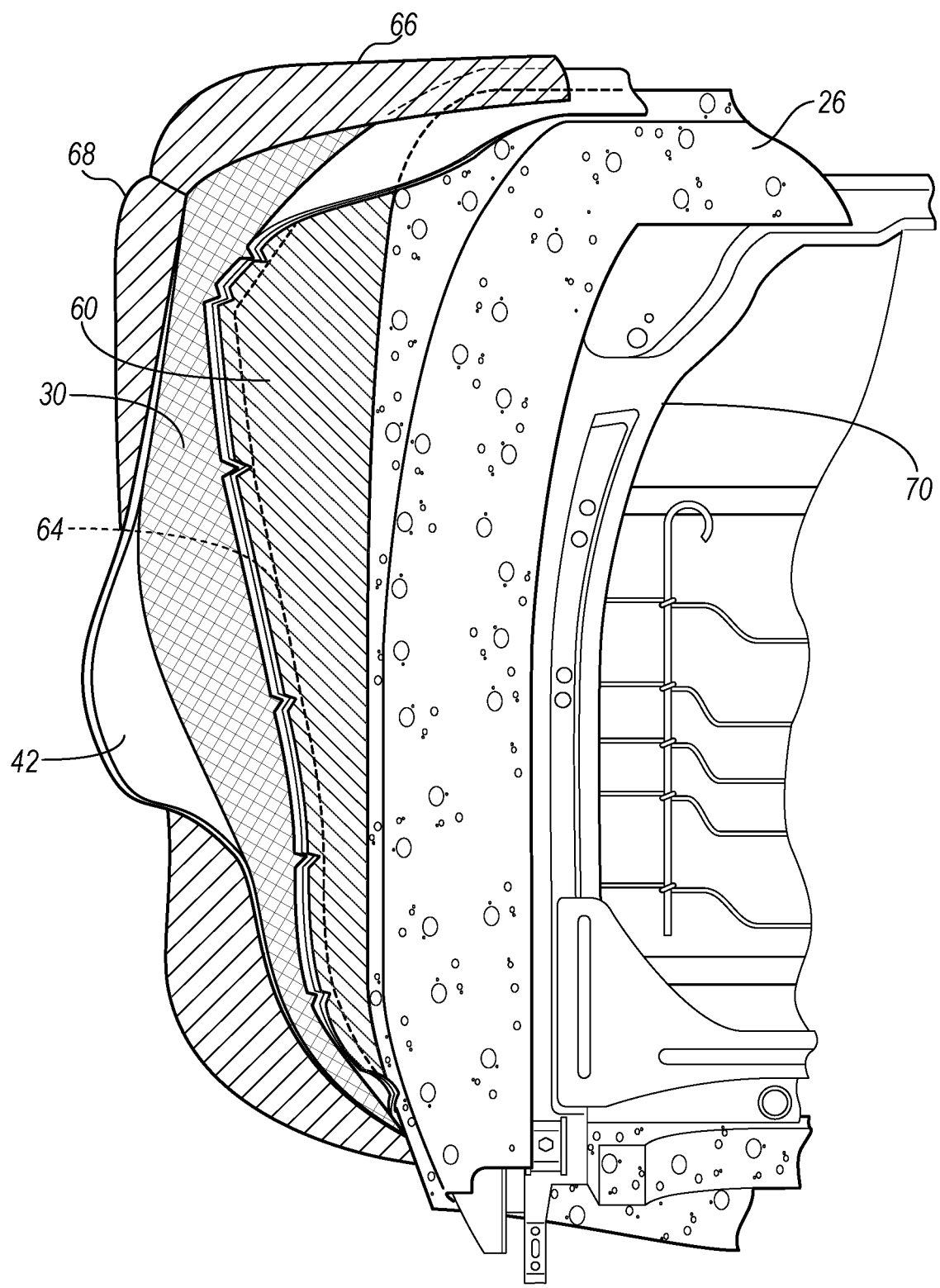
FIG. 2 is a perspective view of the interior of the vehicle seat assembly with the back panel removed and partially disassembled.

The interlay material 60 is sewn to the trim panel 68 at the seam 64 that is located opposite of the deployment seam 74. In at least one embodiment, the interlay seam 64 is opposite the deployment seam relative to the airbag module 22. As shown in FIGS. 1-3, the deployment seam 74 is forward of the interlay seam 64 along the seat assembly 10. The deployment seam 74 is located forward of airbag module 22 while the interlay seam 64 is rearward of the airbag module 22.

The interlay material 60 is not attached to the trim cover 30 at the deployment seam 74. The deployment seam is a safety critical seam having characteristics configured to rupture when the airbag module 22 is deployed. The characteristics of the deployment seam 74 may be defined by the stitch spacing, stitch density, thread material, thread tension, stitch pattern, etc. In contrast, the interlay seam 64 has at least one seam characteristics different than the deployment seam 74.

The airbag module 22 is positioned in the opening 52 defined in the seat cushion 26. The foam seat cushion 26 is supported on a seat frame 70 and provides support and comfort for a seated occupant. The cushion 26 may be made of any suitable material, such as foam or a molded polymeric material.

The foam cushion 26 may have an airbag guide or cushion shield (not shown) to help reduce friction on the air bag and protect the cushion 26 as the airbag rapidly deploys. The guide may be made of any suitable material that can flex with the cushion 26 upon airbag deployment and withstand forces associated with airbag deployment without damage such as tearing. The airbag guide or cushion shield inhibits contact between the deploying air bag and the seat cushion 26 and helps to prevent small particles from separating from the cushion and being introduced into the vehicle compartment. For example, the cushion shield may be a fleece, textile material, or polymer material. The guide may be configured to help direct deployment of the airbag at the deployment seam 74. For example, the guide extends from the airbag module opening 52 in the cushion 26 to the deployment seam 74. The interlay material 60 may extend in an opposite direction of the airbag guide.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat frame;
   a foam cushion supported on the seat frame;
   an airbag module positioned in an opening formed in the foam cushion; and
   a trim cover assembly covering the foam cushion and airbag module and having an interlay material sewn to a trim panel at an interlay seam,
   wherein the interlay material extends from the interlay seam to entirely cover an outboard surface of the airbag module inside the trim panel to ensure the airbag module is not visible through the trim panel.

2. The vehicle seat assembly of claim 1, wherein the seat frame defines a bolster portion of the seat; and
   the airbag module is positioned in the opening formed in the foam cushion along the bolster portion.

3. The vehicle seat assembly of claim 1, further comprising a back panel secured to the seat frame, wherein the interlay seam is concealed by the back panel.

4. The vehicle seat assembly of claim 1, wherein the interlay material has a fabric stiffness greater than the trim panel.

5. The vehicle seat assembly of claim 1, wherein the interlay material comprises a polyester fleece.

6. A vehicle seat assembly comprising:
   a foam cushion layer;
   an airbag module positioned in an opening along the foam cushion layer;
   a trim panel covering the foam cushion and airbag module;
   an interlay material sewn to the trim panel, wherein the airbag module is arranged between the interlay material and the foam cushion layer, and
   wherein the interlay material extends along an entire outboard surface of the airbag module to ensure the airbag module is not visible through the trim panel.

7. The vehicle seat assembly of claim 6, wherein the interlay material has an interlay area less than a panel area of the trim panel to which the interlay material is sewn.

8. The vehicle seat assembly of claim 6, further comprising a seat frame, wherein the foam cushion layer is supported on the seat frame.

9. The vehicle seat assembly of claim 6, further comprising a deployment seam defined along the trim panel, wherein the interlay material is not attached to the trim panel at the deployment seam.

10. The vehicle seat assembly of claim 9, wherein the interlay material is sewn to the trim panel at a seam on an opposite side along the an outboard surface of the airbag module than the deployment seam.

11. The vehicle seat assembly of claim 9, wherein the deployment seam is forward of the airbag module and an interlay seam along which the interlay material is sewn to the trim panel is positioned rearward of the airbag module.

12. The vehicle seat assembly of claim 11, wherein the deployment seam has seam characteristics configured to rupture when the airbag module is deployed, and wherein the interlay seam has seam characteristics different than the deployment seam.

13. The vehicle seat assembly of claim 6, wherein the interlay material has a fabric stiffness greater than the trim panel.

14. A bolster assembly for a vehicle seat, the bolster assembly comprising:
    a first trim panel and a second trim panel defining a deployment seam;
    an interlay material sewn to the first trim panel at an interlay seam spaced apart from the deployment seam;
    a frame; and
    an airbag module arranged between the interlay material and the frame, wherein the interlay material covers an entire outboard surface of the airbag module.

15. The bolster assembly of claim 14, wherein the interlay material is sewn to the trim panel at a seam on an opposite side along the outboard surface of the airbag module than the deployment seam.

16. The bolster assembly of claim 14, wherein the interlay material is not attached to the trim panel at the deployment seam.

17. The bolster assembly of claim 14, wherein the interlay material has a fabric stiffness greater than the trim panel.

18. The bolster assembly of claim 14, wherein the interlay material has a thickness in the range of 1.2 millimeters to 1.4 millimeters.

19. The bolster assembly of claim 14, wherein the deployment seam is forward of the airbag module and the interlay seam is located rearward of the airbag module.

20. The bolster assembly of claim 14, wherein the interlay material comprises a polyester fleece.

* * * * *